United States Patent [19]
Dunn

[11] Patent Number: 5,359,893
[45] Date of Patent: Nov. 1, 1994

[54] MULTI-AXES GYROSCOPE

[75] Inventor: William C. Dunn, Mesa, Ariz.

[73] Assignee: Motorola, Inc., Schaumburg, Ill.

[21] Appl. No.: 810,062

[22] Filed: Dec. 19, 1991

[51] Int. Cl.$^5$ .............................................. G01P 9/04
[52] U.S. Cl. ...................................................... 73/505
[58] Field of Search .................... 73/505, 510, 517 AV

[56] References Cited

U.S. PATENT DOCUMENTS

| | | | |
|---|---|---|---|
| 4,654,663 | 3/1987 | Alsenz et al. | 73/505 |
| 4,744,249 | 5/1988 | Stewart | 73/505 |
| 5,001,940 | 3/1991 | Ogawa | 73/505 |
| 5,025,346 | 6/1991 | Tang et al. | 73/517 AV |

Primary Examiner—John E. Chapman
Attorney, Agent, or Firm—Eugene A. Parsons

[57] ABSTRACT

A vibration gyroscope with a mass mounted for vibrational movement on a central post. Sensing capacitors are mounted adjacent the mass for sensing vibrational movement in two perpendicular axes. The mass includes a pair of elements mounted between the parallel arms of an H shaped frame and powered for equal and opposite vibrations so that no movement is imparted to the frame except that caused by forces induced by rotational movement.

10 Claims, 9 Drawing Sheets

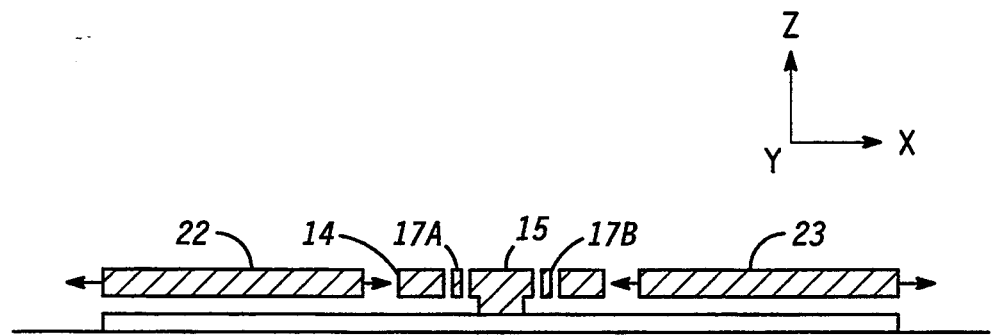
FIG. 2
FIG. 4
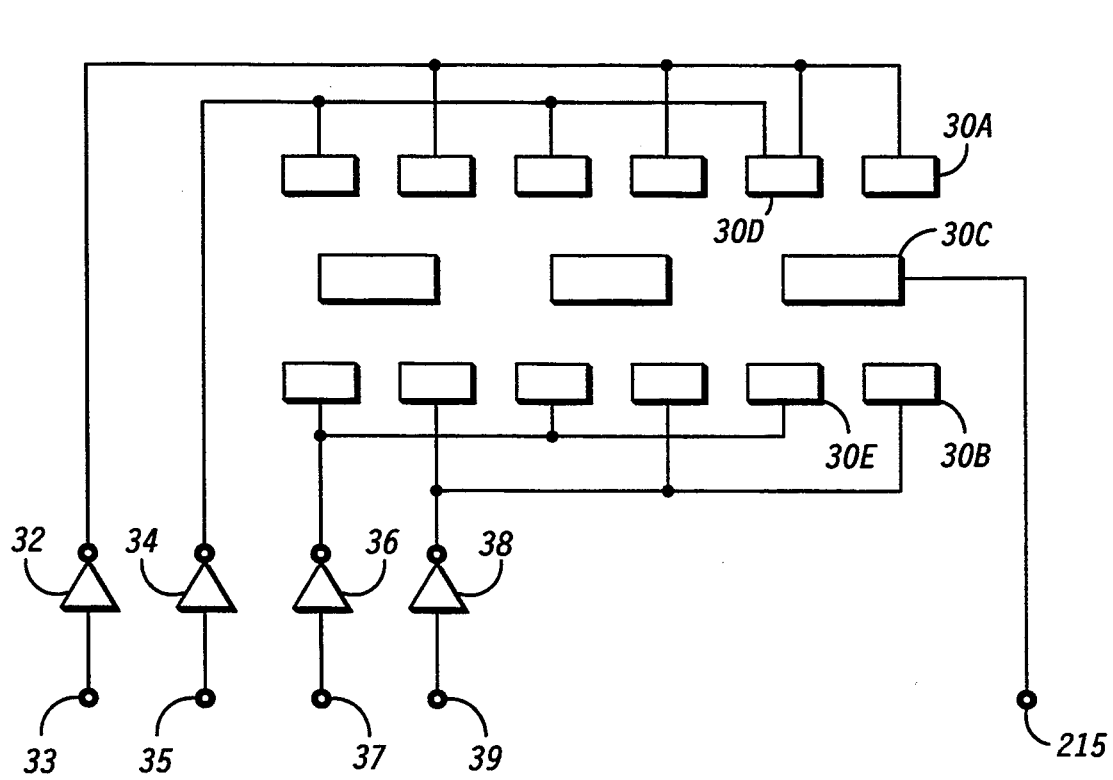

MULTI-AXES GYROSCOPE

The present invention pertains to micromechanical gyroscopes and more specifically to multi-directional micromechanical gyroscopes.

BACKGROUND OF THE INVENTION

In the past, gyroscopes and gyroscopic devices were constructed of relatively large and expensive electromagnetic devices. These electromagnetic devices incorporated coils and position sensors mounted for relatively high speed, continuous rotational movement.

Eventually, micromechanical rate gyros were developed which included components formed by semiconductor processing techniques. While these devices are relatively small and utilize vibrational motion rather than continuous rotary motion, they are relatively insensitive and costly to manufacture.

Generally, the micromechanical rate gyros are constructed with a central mass, which because of the size of the gyro is very small and requires some very heavy material such as gold to provide sufficient mass. The central mass is mounted in a gimbal structure including mutually orthogonal flexible axes, with the mass and gimbal structure generally lying in a common plane. The central mass and inner mounting gimbal are oscillated or vibrated about a first of the orthogonal axes and rotational movement about an axis perpendicular to the common plane produces vibrational movement about the other of the orthogonal axes, due to the Coriolis, or gyroscopic, effect.

The described micromechanical rate gyro has several problems. Specifically, the centrally mounted mass is expensive and difficult to manufacture. It is difficult to achieve a large enough mass to provide sufficient inertia for good sensitivity and this construction reduces sensing capacitor sensitivity. Also, if the mass is offset even slightly within the gimballed mounting a noticeable sensitivity to cross-axis acceleration is produced. Second, the amount of vibrational movement is limited by the fact that the planar constructed gimbal system is mounted adjacent to a planar surface and increasing the distance between the gimbal system and the planar surface substantially increases the size of the device, which reduces sensitivity due to increased capacitor spacing as well as increasing the cost and complexity of construction. Further, by constructing the device so that the input axis is perpendicular to the common plane, the device is limited to a single axis device. Since the device only senses movement about a single axis, three of the devices must be mounted with the input axes in a mutually orthogonal relationship to sense movement in all directions.

To further reduce the size, cost and usefulness Of rate gyros, there is a need for micromechanical rate gyros with increased sensitivity, due to increased inertia achieved by an increased distance of movement and/or an increase in effective mass, higher vibration frequency and smaller capacitive plate separation. Further, it would be convenient to sense movement about more than one axis with a single device.

SUMMARY OF THE INVENTION

It is a purpose of the present invention to provide a new and improved multi-axes vibration monolithic gyroscope.

It is a further purpose of the present invention to provide a new and improved vibration monolithic gyroscope that is capable of measuring rotational motion about more than one axis.

It is a further purpose of the present invention to provide a new and improved multi-axes vibration monolithic gyroscope that is small, inexpensive and reproducible, batch manufacturable.

These and other purposes and advantages are realized in a multi-axes vibration monolithic gyroscope formed on a semiconductor substrate and including a mass mounted for vibrational movement parallel to the substrate and sensing apparatus positioned adjacent the mass for sensing forces produced by rotational movement on the mass about two orthogonal axes.

BRIEF DESCRIPTION OF THE DRAWINGS

Referring to the drawings:

FIG. 2 is a sectional view as seen from the line 2—2 in FIG. 1;

FIG. 4 is a sectional/schematic illustration of a portion of the gyroscope of FIG. 1;

DESCRIPTION OF THE PREFERRED EMBODIMENT

Figure 1:
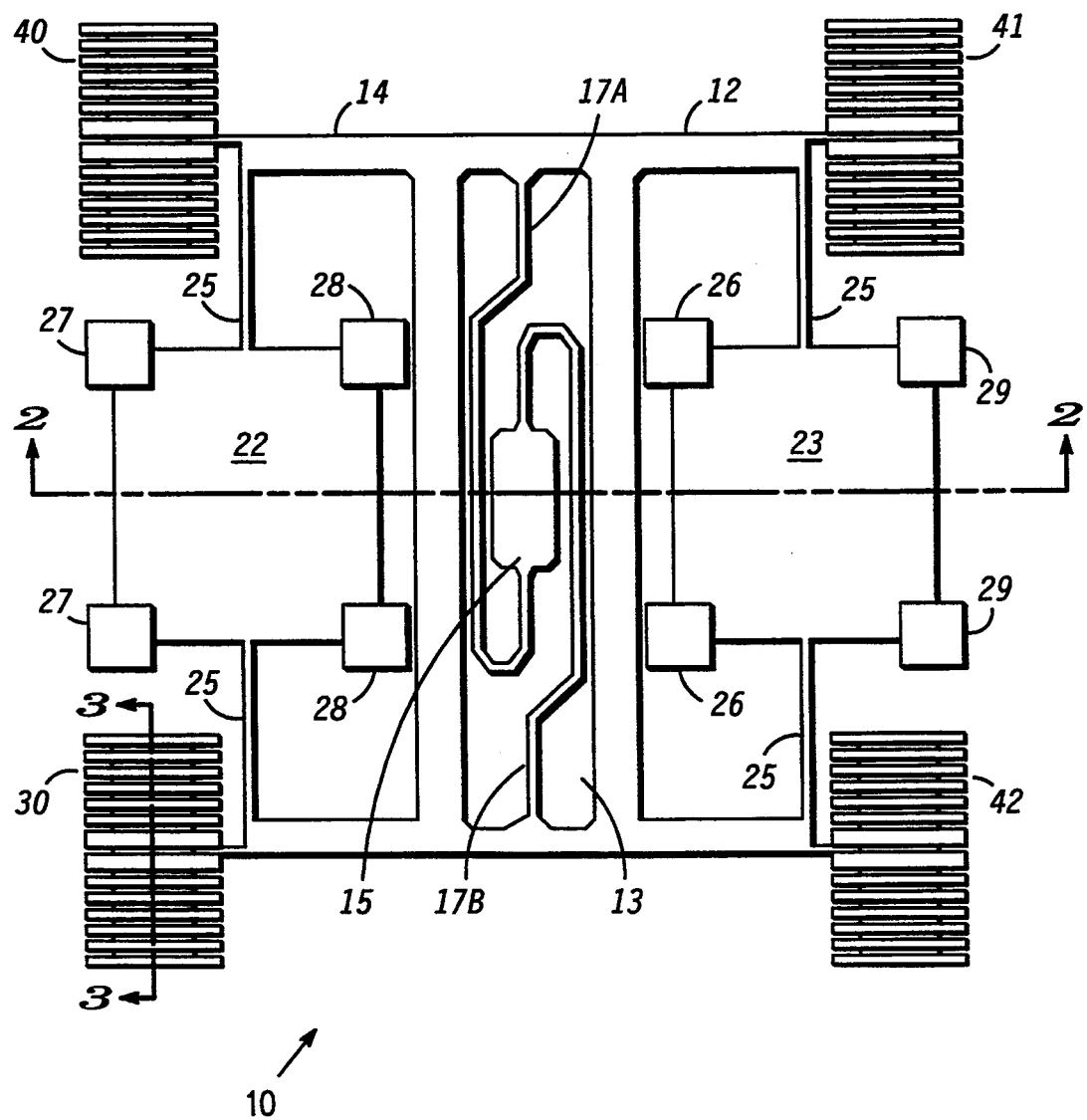
FIG. 1 is a view in top plan of a multi-axes vibrational gyroscope embodying the present invention.

Referring specifically to FIG. 1, a multi-axes vibration monolithic gyroscope 10 is illustrated embodying the present invention. Gyroscope 10 includes a mass 12 with a generally H shaped frame 14 having a central opening 13 through the middle cross-arm of the frame. A centrally located mounting post 15 is affixed to a planar surface of a substrate so as to be perpendicular thereto. Post 15 defines the Z axis of gyroscope 10. Frame 14 is moveably attached to post 15 by means of a plurality, in this specific embodiment two, of helical springs 17A and 17B. Each of the helical springs 17A and 17B are fixedly attached to post 15 at one end and to the inner edge of opening 13 of frame 14 at the other end. Helical springs 17A and 17B are designed to maintain frame 14 in a plane parallel to the planar surface of the substrate while allowing limited vibrational movement in all directions.

Mass 12 further includes a pair of generally rectangularly shaped mass elements 22 and 23 mounted in the openings between the parallel arms of H shaped frame ].4. Each mass element 22 and 23 is affixed to the parallel arms of frame 14 by means of elongated resilient members 25 one each extending from the end of an arm to opposed sides; of mass elements 22 and 23. Resilient members 25 mount mass elements 22 and 23 for vibrational movement, independent of frame 14, along an X axis extending through each of the mass elements 22 and 23 and through the end of mounting post 15, perpendicular to the Z axis. A Y axis is further defined by mass 12 and extends in the plane of mass 12, through the end of post 15, mutually perpendicular to the X and Z axes.

Figure 5:
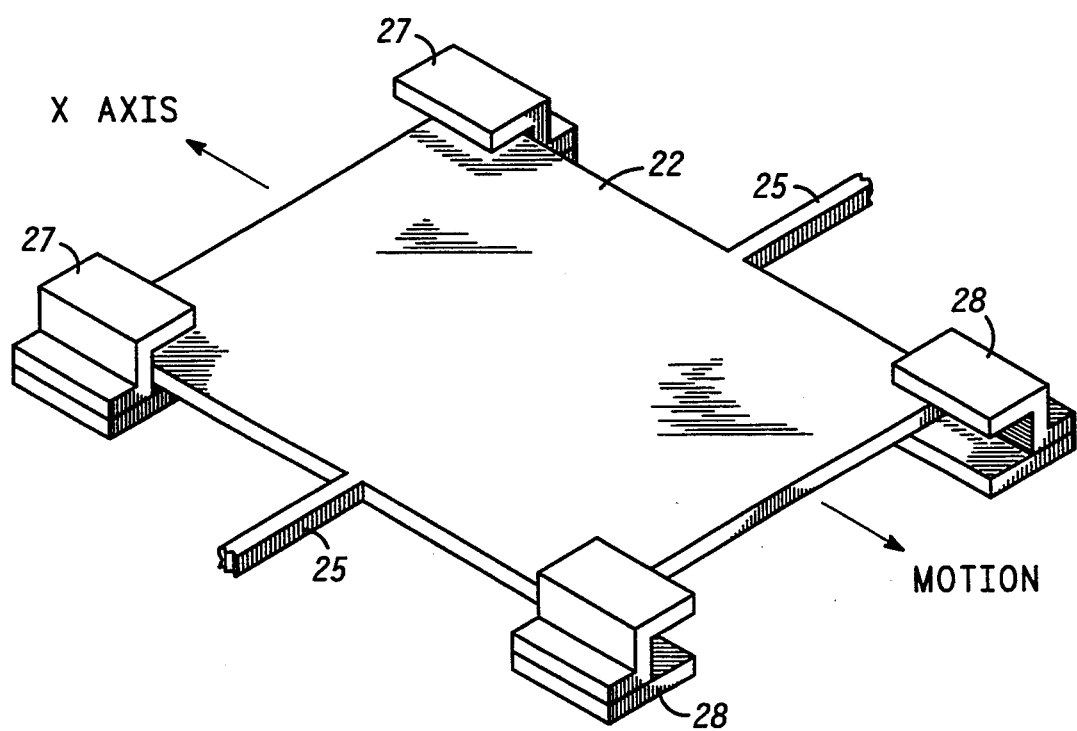
FIG. 5 is an enlarged view in perspective of a portion of FIG. 1.

Pluralities of driving elements 26, 27, 28 and 29 each include upper and lower parallel, spaced apart rectangular conducting plates. In this specific embodiment each plurality of driving elements 26, 27, 28 and 29 includes a pair of driving elements with the pair of driving elements 27 being positioned adjacent the left-hand corners of mass element 22 in FIG. 1, the pair of driving elements 28 being positioned adjacent the right-hand corners of mass element 22, the pair of driving elements 26 being positioned adjacent the left-hand corners of mass element 23 and the pair of driving elements 29 being positioned adjacent the right-hand corners of mass element 23. The pair of conducting plates of each of the driving elements of the pluralities of driving elements 26, 27, 28 and 29 are positioned above and below (in FIGS. 1 and 5) the corners of mass elements 22 and 23. All of the conducting plates of the driving elements 26, 27, 28 and 29 are also parallel to mass 12. The plates 26 are electrically connected, as are plates 27, 28 and 29. FIG. 5 is an enlarged view in perspective illustrating in more detail mass element 12 and driving elements 27 and 28.

By alternately pulsing plates 27 and 28 and plates 29 and 26, the electrostatic attraction between plates 27, 28 and mass element 22, and similarly between plates 29, 26 and mass element 23, produces vibrational movement along the X axis of mass elements 22 and 23 independent of frame 14. The driving elements are diametrically opposed and positioned to produce uniform vibrational movement of mass elements 22 and 23 in opposite directions, with synchronized driving pulses which results in zero force on frame 14, generally as experienced in a tuning fork.

For instance, if a voltage is applied between plates 27 and element 22 and simultaneously between plates 29 and element 23, both elements 22 and 23 move outwards due to the resulting electrostatic forces. This voltage is applied until a predetermined differential capacitance is detected between plates 27, 28 and mass element 22 and similarly between plates 29, 26 and mass element 23. At this point the voltage is removed from plates 27 and 29 and applied to plates 28 and 26. Mass elements 22 and 23 are now driven inwards towards post 15, again until a predetermined capacitance is detected. The cycle is then repeated. Using this approach mass elements 22 and 23 are synchronously driven outwards and inwards at their natural resonant frequency with a known amplitude set by the differential capacitor trip points. The sensing of the differential capacitances and driving of mass elements 22 and 23 is accomplished by periodically sampling the capacitance during the driving cycle.

Sensing apparatus, which includes sensing capacitors 30, 40, 41 and 42, one each, mounted at the end of each arm of frame 14, is designed to sense rotation of gyroscope 10 and frame 14 about the Y and Z axes. Each sensing capacitor 30, 40, 41 and 42 includes a set of fixedly mounted upper plates, a set of fixedly mounted lower plates and a set of central plates attached to the end of frame 14 for movement therewith. For example, sensing capacitor 30 includes upper plates 30A and 30D, lower plates 30B and 30E and central plates 30C, as illustrated in more detail in FIGS. 3 and 4, with each of the other sensing capacitors 40, 41 and 42 being similarly designated. In this specific embodiment, all of the capacitor plates are formed in the shape of elongated fingers extending in parallel spaced apart relationship.

Referring specifically to FIG. 4, it can be seen that the upper capacitor plates and the lower capacitor plates are formed in pairs of plates. Each upper pair including a plate 30A and a plate 30D and each lower pair including a plate 30B and a plate 30E. Each upper and lower pair being positioned in partial overlapping relationship to a single central plate 30C. Further, in this specific embodiment, each sensing capacitor 30 is divided into two sets of capacitors each set including fourteen upper plates 30A, 30D (six shown), fourteen lower plates 30B, 30E (six shown) and seven center plates 30C, (three shown), one set of which is illustrated in FIG. 4.

The operation of gyroscope 10 can be seen most easily by referring to the set of capacitor plates illustrated in FIG. 4 for example. The second, fourth, sixth, etc. upper plates 30A are connected together and by means of an inverter 32 to a terminal 33. The first, third, fifth, etc. upper plates 30D are connected together and by means of an inverter 34 to a terminal 35. The first, third, fifth, etc. lower plates 30E are connected together and by means of an inverter 36 to a terminal 37. The second, fourth, sixth, etc. lower plates 30B are connected together and by means of an inverter 38 to a terminal 39. By applying appropriate voltages to the various capacitor plates 30A–30E the electrostatic forces between plates 30A–30E and 30C can be used in a manner to maintain plates 30C approximately centered between plates 30A–30E, gyroscope 10 remains in the most sensitive mode and the amount of drive required to center the capacitor plates is measured to determine the amount and direction of the rotationally induced forces acting on gyroscope 10.

Figure 6A:
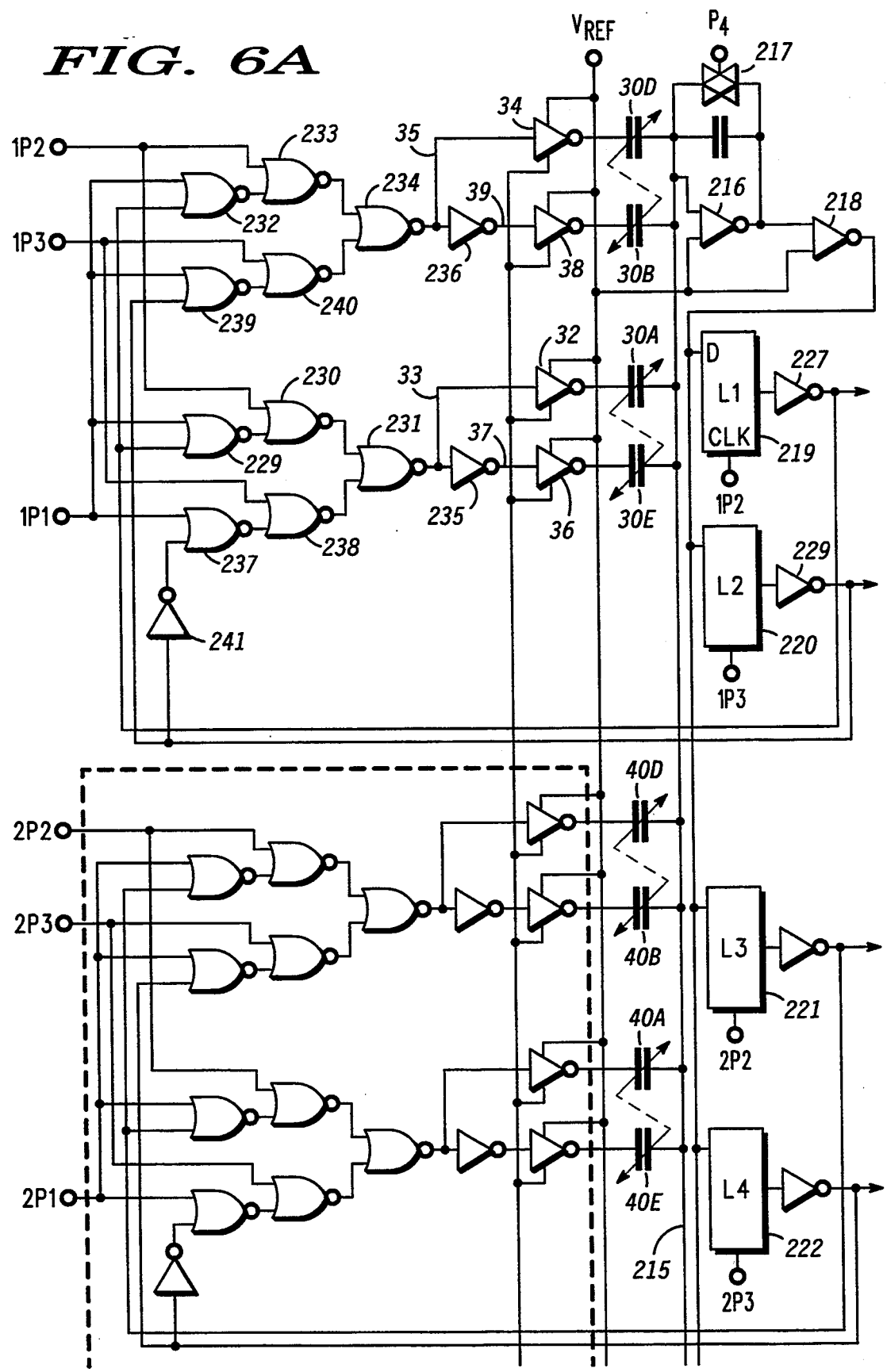
FIG. 6 is a schematic diagram of a sensing and control circuit electrically attached to the gyroscope of FIG. 1.
Figure 6B:
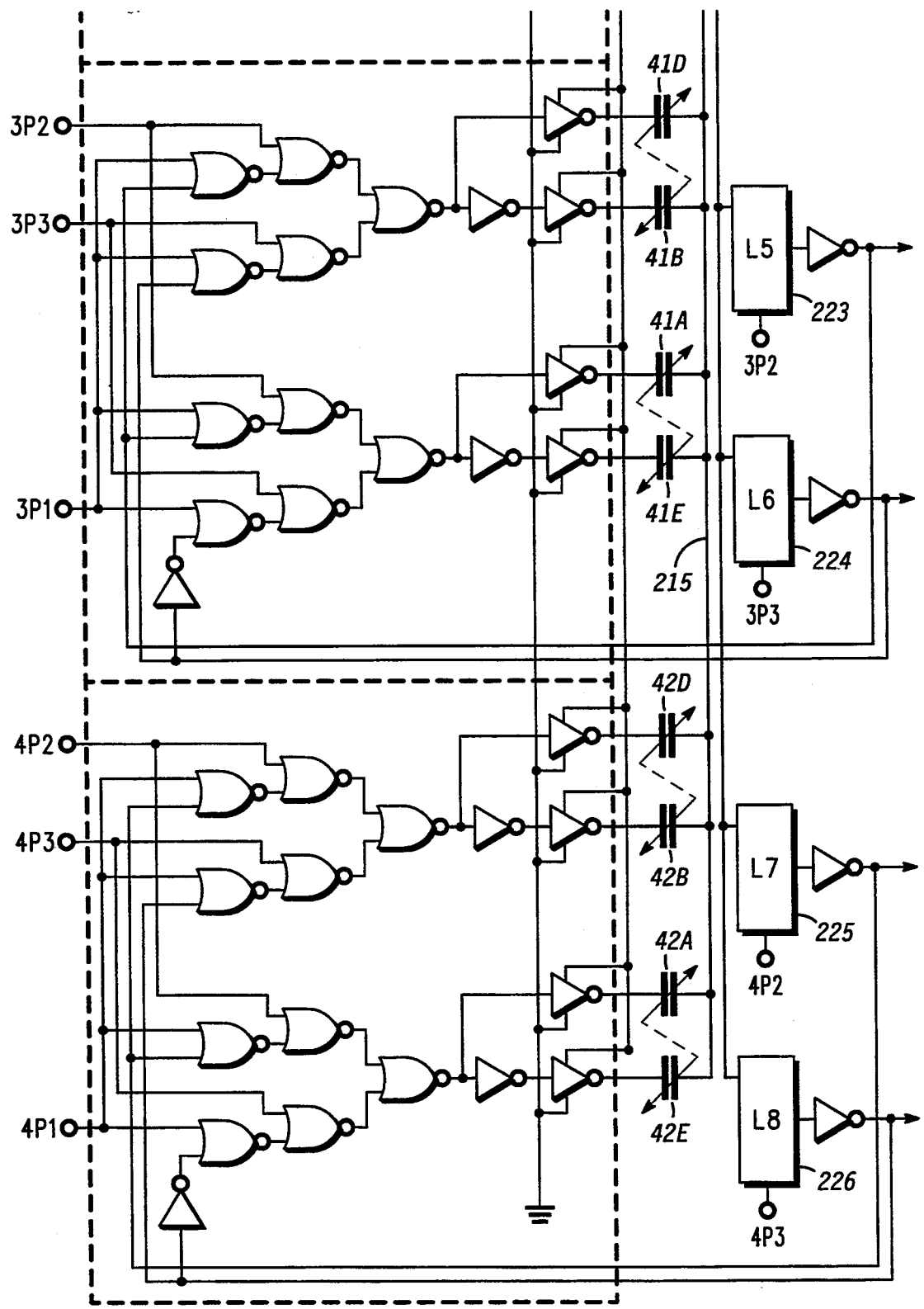
Figure 7:
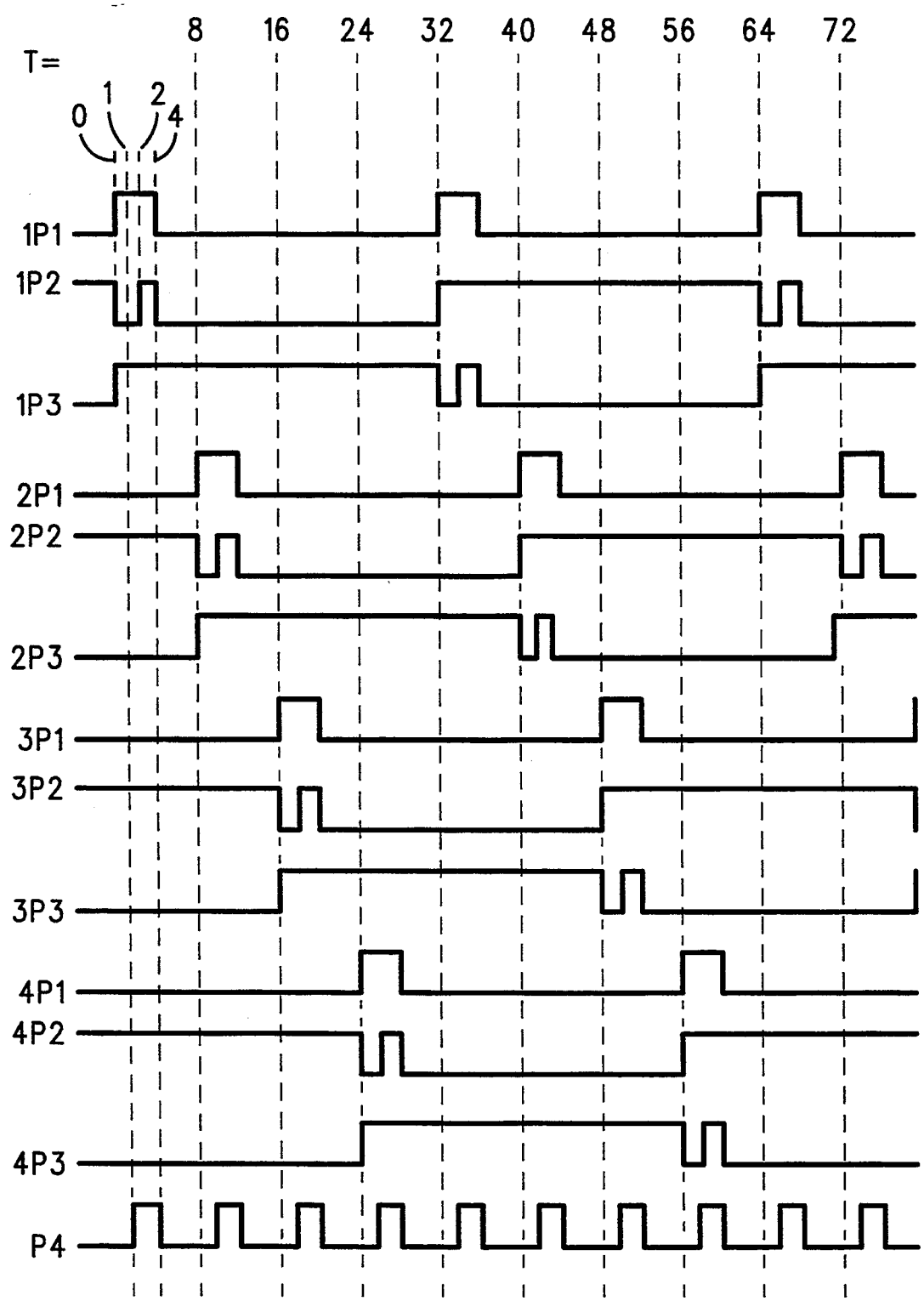
FIG. 7 illustrates waveforms available at various points of the sensing and control circuit of FIG. 6.
Figure 8:
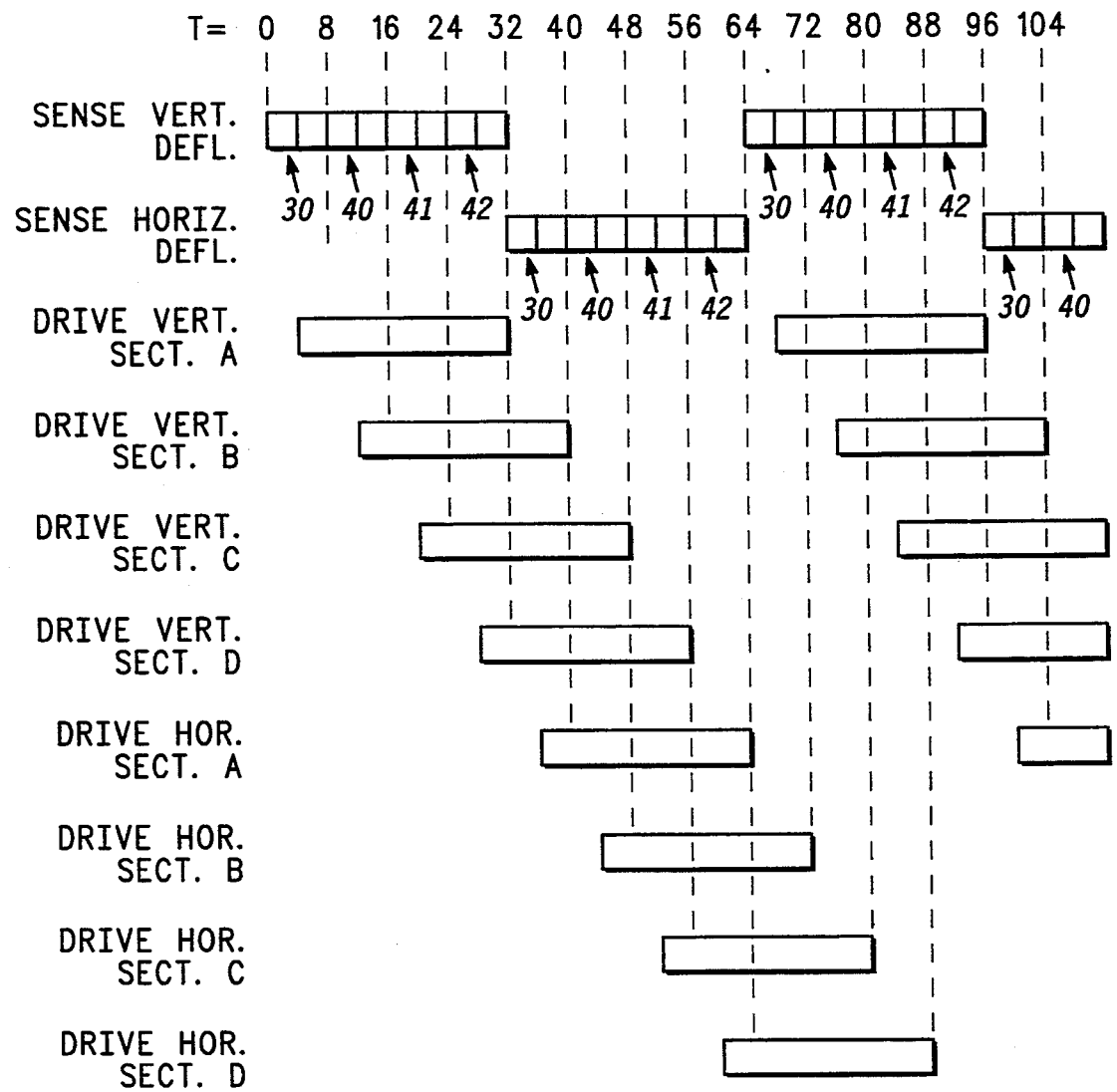
FIG. 8 is a time-function chart illustrating the relationship between time and the various control functions of the sensing and control circuit of FIG. 6.

FIG. 6 illustrates a schematic diagram of a sensing and control circuit electrically attached to gyroscope 10 of FIG. 1. FIG. 7 illustrates waveforms available at various points in the sensing and control circuit. FIG. 8 is a time-function chart illustrating the relationship between time and the various control functions of the sensing and control circuit of FIG. 6 over a limited time span. Central post 15, frame 14, mass elements 22 and 23 and the center plates 30C, 40C, 41C and 42C of sensing capacitors 36, 40, 41 and 42 are all electrically connected and designated node 215 in FIG. 6. Sensing and control signals are applied to the capacitor plates 30A–E, 40A–E, 41A–E and 42A–E via the logic components illustrated.

At time T=0 (FIG. 7) an input terminal 1P1 goes high forcing ground potential on capacitor plates 30B and 30E and $V_{REF}$ on capacitor plates 30A and 30D. Also, an input terminal 1P2 is driven low and an input terminal 1P3 is driven high to allow signals from a first latch 219 to control the drive voltages on capacitor plates 30A, 30B, 30D and 30E. Center plates 30C are held at VREF by a virtual ground amplifier 216. Amplifier 216 has unity gain due to a switch 217 being closed by a low signal on an input terminal P4.

At time T=1, input terminal P4 is driven high and switch 217 is turned off so that amplifier 216 becomes active as a virtual ground integrating amplifier. At time T=2, input terminal 1P2 is switched from low to high, which forces the voltage on capacitor plates 30B and 30E to switch from ground to $V_{REF}$ and capacitor plates 30A and 30D to switch from $V_{REF}$ to ground. Any difference in the capacitances formed by capacitor plates 30B, 30E and 30C versus 30A, 30D and 30C will result in a charge on node 215, which is amplified, inverted and converted into a voltage by amplifier 216. The signal from amplifier 216 is further amplified by an amplifier 218.

At time T=4, after the amplifiers have had time to settle, the output signal of amplifier 218 is latched by latch 219. Latch 219 is a negative edge, triggered latch circuit clocked by the signal 1P2. In latch 219, a positive voltage from amplifier 218 is latched as a high and a negative voltage is latched as a low. The output signal from latch 219 is fed back via inverter 227 and logic gates 229 thru 234 to inverters 235, 236, 36, 32, 38 and 34, which apply $V_{REF}$ and ground to capacitor plates 30D & 30A and & 30E. VREF and ground potentials are applied to capacitor plates 30D & 30A and 30B & 30E to generate an electrostatic force on capacitor plates 30C to force them towards and maintain them in a central vertical position during time T=4 to T=32. It should be noted that there is no resulting horizontal force.

At time T=32, input terminal 1P2 is driven from low to high and input terminal 1P3 is driven from high to low. Thus, during time T=32 to T=36 the differential capacitance between capacitor plates 30D & 30E and 30C and between capacitor plates 30B & 30A and 30C is sensed and the signal is latched into a second latch 220. When the input signal on input terminal 1P3 goes low, the output signal from latch 220 is fed back via gates 237, 238, 231 239, 240 and 234 to inverters 34, 38, 32, 36, 228, 241, 235 and 236, which apply $V_{REF}$ and ground to capacitor plates 30D & 30E and 30B & 30A. VREF and ground potential are applied to capacitor plates 30D & 30E and 30B & 30A to generate an electrostatic force on plates 30C to force plates 30C toward and to maintain them in the central horizontal position during time T=36 to T=64. Again it should be noted that there is no resulting vertical force. At time T=64 the above cycle is repeated. Thus during alternating cycles the vertical position is sensed and corrective forces applied and then the horizontal position is sensed and the corrective forces applied, as illustrated in FIG. 6, in a closed loop mode of operation.

Similarly, at time T=8 to T=12 the vertical position of capacitor plates 40C are sensed and corrective forces are applied from T=12 to T=40. The horizontal position of capacitor plates 40C is sensed from T=40 to T=44 and horizontal corrective forces are applied from T=44 to T=72. Similar modes and timing are provided for capacitor plates 41C and 42C in the timing chart of FIG. 8. Also, three additional blocks, each containing logic circuits similar to those described above, are illustrated in FIG. 6. Thus, each set of capacitor plates is sampled and corrective action taken in each section to centralize the position of frame 12.

Using an MPU or other special custom logic, not shown, latch circuits 219 through 226 are sampled and the average high and low driving periods are compared over extended time periods. For example, by comparing:

| Time Driving | | Time Driving |
|---|---|---|
| 41C Vert. + 42C Vert. | vs. | 30C Vert. + 40C Vert. | the rotational movement rate about the Y axis is measured. Any linear acceleration in the Z direction has a similar effect on capacitor plates 41C vert.+40C vert. and on 30C vert.+42C vert.so that these changes in the above inequality cancel.

Similarly, by comparing:

| Time Driving | | Time Driving |
|---|---|---|
| 30C Horiz. + 41C Horiz. | vs. | 40C Horiz. + 42C Horiz. | the rotational movement rate about the Z axis is measured. Also, by comparing:

| Time Driving | Time Driving |
|---|---|
| 30A + 30D + 40A + 40D + 41A + 41D + 42A + 42D | vs. 30E + 30B + 40E + 40B + 41E + 41B + 42E + 42B | the linear acceleration along the Z axis is measured and any rotational rate cancels. It should be noted that by measuring the time domain, for example against an MPU crystal, very accurate measurements can be made and, over extended periods of time using digital methods, very wide dynamic ranges can be measured. In this fashion accurate measuring, noise cancellation and a very sensitive device is provided. It should of course be noted by those skilled in the art that a sense of rotation about the third mutually orthogonal axis X can be measured by simply providing a second gyroscope, similar to gyroscope 10, but rotated ninety degrees about the Z axis.

Figure 3:
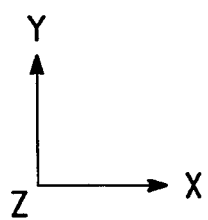
FIG. 3 is a sectional view as seen from the line 3—3 in FIG. 1.
Figure 3:
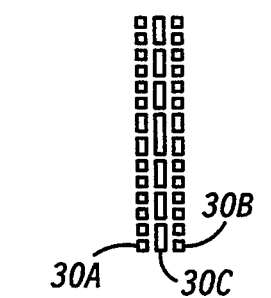

Gyroscope 10 is conveniently manufactured as a micromechanical structure on a semiconductor substrate by well known micromachining techniques including the use of sacrificial layers of etchable material and the growing and/or depositing of semiconductor/conductor layers such as polysilicon, doped silicon, metal, etc. Gyroscope 10 may also be conveniently manufactured by using bulk micromachining and wafer bonding techniques. Whatever technique is utilized, the lower sensing capacitor plates and the lower plates of driving elements 26, 27, 28 and 29 are formed in a first layer supported on the substrate. Post 15, mass 12 and the central capacitor plates are formed in a second layer spaced from the first layer. Post 15 is of course fixedly supported by the substrate. Finally, the upper capacitor plates and the upper plates of driving elements 26, 27, 28 and 29 are formed in a third layer spaced from the second layer. The columns and third layer also serve as stops to limit excessive vertical movement of vibrating mass elements 22 and 23 and frame 12 to make a sensitive yet rugged device. These cross sections are illustrated in FIGS. 2 and 3. The entire structure is formed as small as forty mils on a side.

Figure 9:
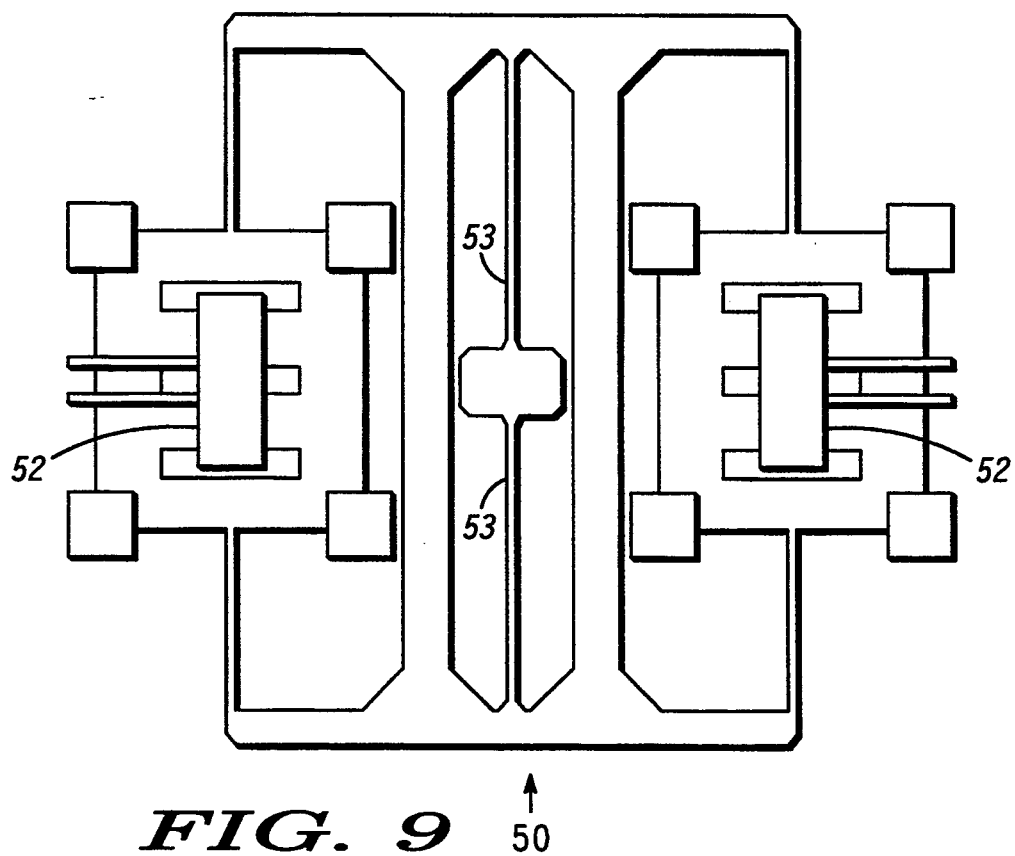
FIG. 9 is a view in top plan, similar to FIG. 1, of another embodiment.

Referring specifically to FIG. 9, another embodiment of a gyroscope, generally designated 50, is illustrated which is constructed to measure rotation about a single axis. Gyroscope 50 includes basically the same mass, central mounting post (with straight suspension arms 53) and driving elements as gyroscope 10. However, instead of the sensing capacitors including a plurality of spaced apart parallel fingers, in this specific embodiment upper sensing capacitor plates 52 and lower plates (not shown) are positioned parallel with the vibrating mass elements. The upper plates are fixedly mounted by means of columns that extend down to the lower plates through slots in the mass elements, although those skilled in the art will devise many ways to accomplish this mounting. In this embodiment the columns and slots and the third layer also serve to prevent harmful over-movements of the mass.

Figure 10:
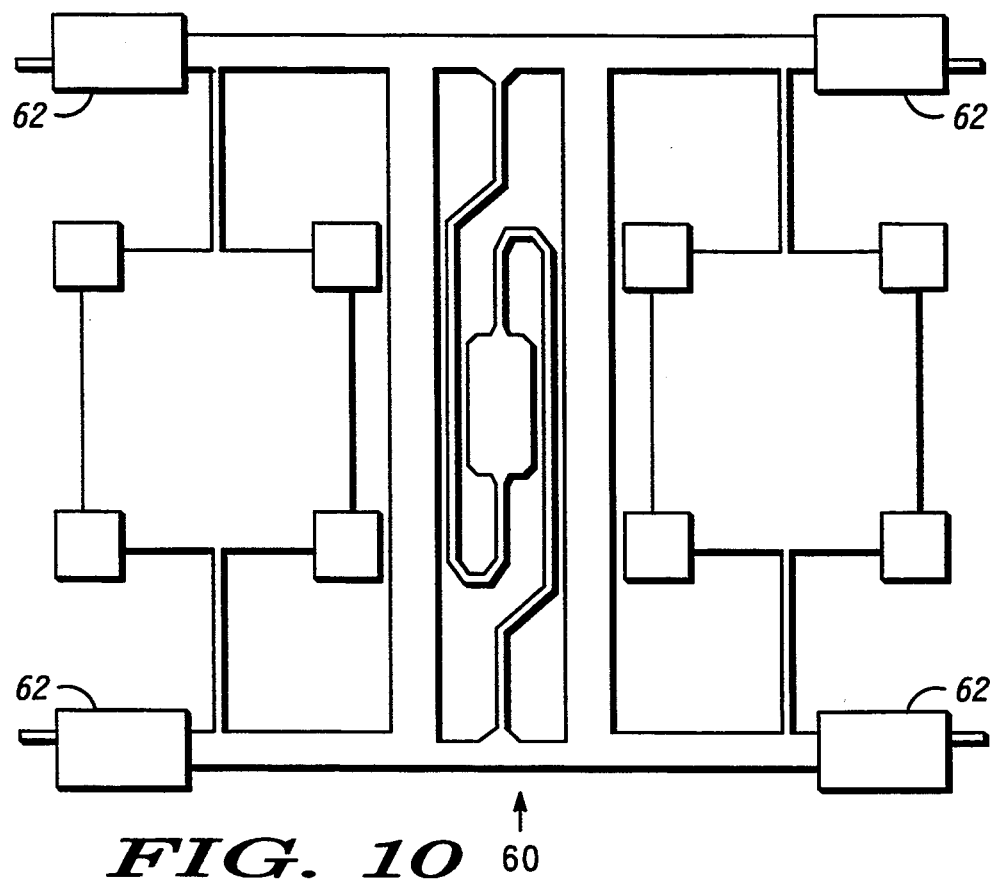
FIG. 10 is a view in top plan, similar to FIG. 1, of yet another embodiment.

Referring specifically to FIG. 10, yet another embodiment of a gyroscope, generally designated 60, is illustrated, which is constructed to measure rotation about a single axis. Gyroscope 60 includes basically the same mass, central mounting post and driving elements as gyroscope 10. However, instead of the sensing capacitors including a plurality of spaced apart parallel fingers, in this specific embodiment upper sensing capacitor plates 62 and lower plates (not shown) are positioned parallel with extended ends of the arms of the mass frame. The upper plates are fixedly mounted by means of columns that extend down to the lower plates along either side of the frame arm extensions, although those skilled in the art will devise many ways to accomplish this mounting. In this embodiment the columns also serve to prevent harmful over-movements of the mass.

Figure 11:
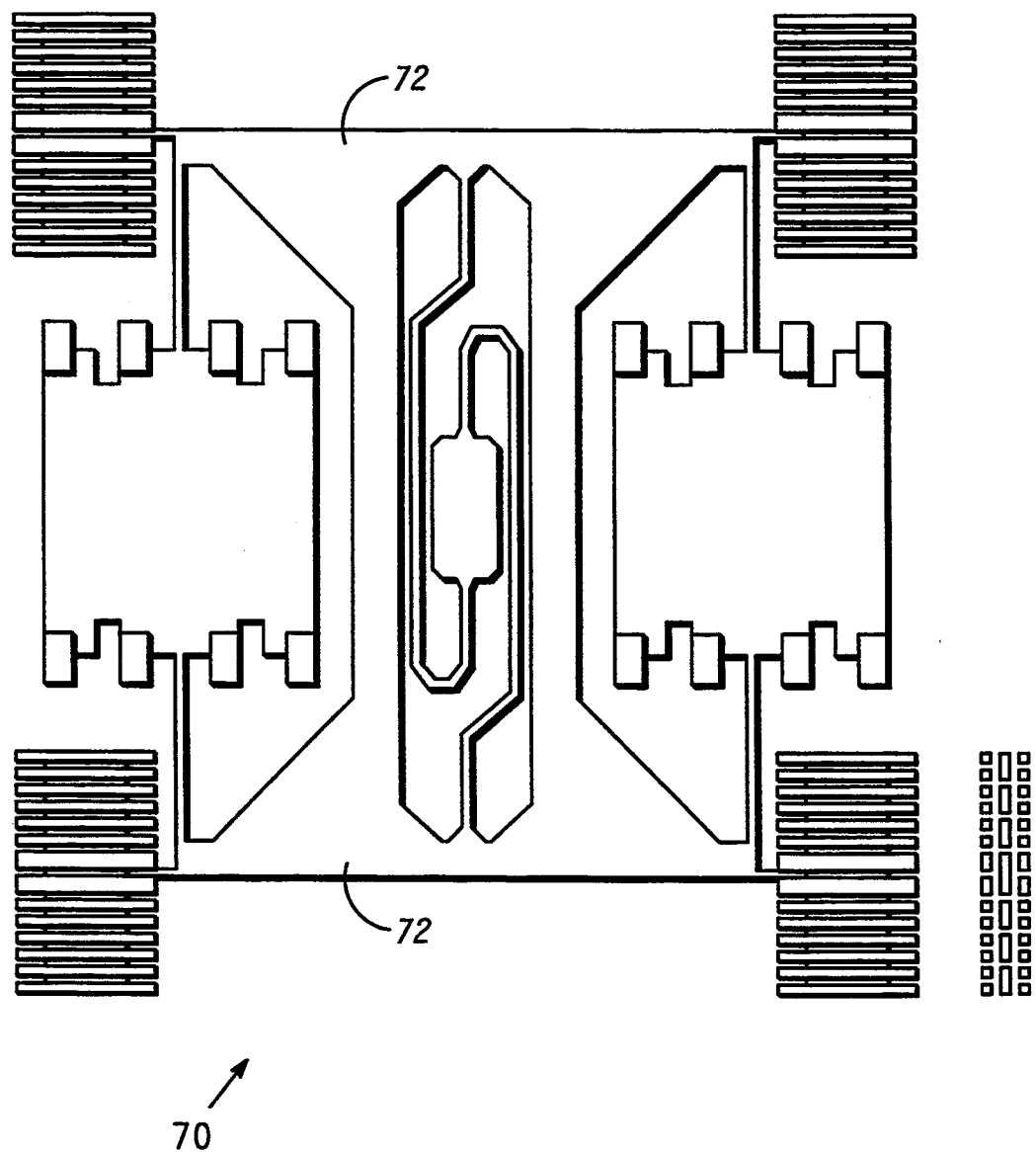
FIG. 11 is a view in top plan similar to FIG. 1 of another embodiment of a vibrational gyroscope.

Referring specifically to FIG. 11, yet another embodiment of a gyroscope, generally designated 70, is illustrated which is constructed to measure rotation about the Z and Y axes. Gyroscope 70 includes basically the same vibrating mass, central mounting post and driving elements as gyroscope 10. However, an H frame 72 has been made wider in order to add mass without effecting the operation of the device when measuring rotation. The added mass improves the sensitivity of the structure when used to measure acceleration in the Z direction as well as giving a more rigid frame.

Gyroscopes 50, 60 and 70 are included to illustrate different sensing apparatus that might be utilized. Also, in a three axes system the third axis of sensitivity might be provided by including one of the gyroscopes 50 or 60, rather than a second gyroscope 10, as suggested above. Finally, it should be noted that the novel structure of the mounting post, mass and driving apparatus results in an extremely sensitive and accurate gyroscope, whether single or multiple axes sensing is utilized.

In the present structures, a single mounting post (although multiple mounting posts could be used if desired) is used to mount a planar mass, which greatly increases the effective mass over prior art structures utilizing gimbal mounted masses. Because of the novel configuration of gyroscopes constructed in conformance with the present invention, the effective mass is greatly increased and, therefore, so is the sensitivity. Further, the novel configuration of the mass in the disclosed embodiments allows for simpler, smaller construction and no additional steps, as required in the prior art to provide sufficient mass. It will of course be understood that the structure could also be constructed using bulk micromachining and wafer bonding techniques. Also, by closing the loop to maintain the mass near the center or neutral position, the dynamic range is substantially increased. Relatively simple apparatus is disclosed for oscillating or vibrating the mass elements of the gyroscope, sensing rotation and maintaining the mass substantially centered. Finally, by utilizing specially designed sensing apparatus the gyroscope is capable of sensing rotation about one or multiple axes and sensing acceleration.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. A multi-axes vibration monolithic gyroscope comprising:
   a mounting post fixedly attached to a base and defining a first axis;
   a planar mass having a first portion fixedly attached to the post for limited relative rotational movement about two orthogonal axes and a second portion fixedly attached to the first portion for relative vibrational movement and the first and second portions being positioned in a plane perpendicular to the post, the mass defining second and third axes mutually perpendicular to each other and to the first axis;
   driving apparatus mounted adjacent to the second portion of the mass for causing the second portion of the mass to move in a vibrational motion along the second axis; and
   sensing apparatus positioned adjacent to the first portion of the mass for sensing movement of the first portion of the mass about the third axis in response to forces produced by rotational motion and for sensing movement of the first portion of the mass about the first axis in response to forces produced by rotational motion.

2. A multi-axes vibration monolithic gyroscope as claimed in claim 1 further including springs affixed at one end to the post and at another end to the first portion of the mass.

3. A multi-axes vibration monolithic gyroscope as claimed in claim 2 wherein the first portion of the mass includes a frame symmetrically mounted by the springs relative to the mounting post.

4. A multi-axes vibration monolithic gyroscope comprising:
   a mounting post fixedly attached to a base and defining a first axis;
   a mass including a frame and a pair of mass elements affixed to the frame by resilient members for vibratory movement along a second axis relative to the frame, the mass being positioned in a plane perpendicular to the post, the mass defining second and third axes mutually perpendicular to each other and to the first axis;
   springs affixed at one end to the post and at another end to the frame of the mass for symmetrically attaching the frame of the mass to the post for rotational movement about the first and third axes;
   driving apparatus mounted adjacent to the mass elements for causing the mass elements to move in a vibrational motion along the second axis; and
   sensing apparatus positioned adjacent to the mass frame for sensing movement of the mass frame about the third axis in response to forces produced by rotational motion and for sensing movement of the mass frame about the first axis in response to forces produced by rotational motion.

5. A multi-axes vibration monolithic gyroscope as claimed in claim 4 wherein the driving apparatus is mounted adjacent each of the pair of mass elements.

6. A multi-axes vibration monolithic gyroscope as claimed in claim 5 wherein the sensing apparatus includes capacitor plates in three layers, spaced apart in a direction parallel to the first axis, with centrally located capacitor plates being affixed to the frame for movement therewith.

7. A multi-axes vibration monolithic gyroscope as claimed in claim 6 wherein the capacitor plates include elongated fingers positioned in partially overlapping relationship.

8. A multi-axes vibration monolithic gyroscope as claimed in claim 6 wherein the mounting post, the springs, the frame, the mass elements and resilient members and the centrally located capacitor plates are formed in a common layer of material.

9. A multi-axes vibration monolithic gyroscope comprising:
   a substrate having a generally planar surface;
   a central mounting post fixedly attached to the planar surface of the substrate, generally perpendicular to the planar surface of the substrate and defining a first axis;
   a mass including a frame having a central opening therethrough and positioned symmetrically about the post in a plane parallel to the planar surface of the substrate, the mass further including a pair of mass elements affixed to the frame by resilient members for vibrational movement relative to the frame along a second axis perpendicular to the first axis and in the parallel plane;
   generally helical springs affixed at one end to the post and at another end to the frame of the mass within the central opening, and mounting the mass for vibrational movement relative to the post;
   vibrational motion driving apparatus mounted adjacent to the pair of mass elements for causing the pair of mass elements to move in a vibrational motion, in opposite directions along the second axis; and
   sensing capacitors, positioned adjacent the mass and defining a third axis mutually perpendicular to the first and second axes, for sensing movement of the mass in the first axis and in the third axis due to forces produced by rotational motion.

10. A multi-axes vibration monolithic gyroscope as claimed in claim 9 including in addition apparatus coupled to the sensing capacitors for sensing movement of the mass in the direction of the first axis due to acceleration of the gyroscope in the direction of the first axis.

* * * * *